United States Patent [19]
Zimmerman

[11] Patent Number: 5,685,246
[45] Date of Patent: Nov. 11, 1997

[54] PLANTING ASSEMBLY FOR SEED DRILL

[76] Inventor: Robert Zimmerman, Box 6, Almira, Wash. 99103

[21] Appl. No.: 636,123

[22] Filed: Apr. 22, 1996

Related U.S. Application Data

[63] Continuation-in-part of Ser. No. 385,154, Feb. 7, 1995, Pat. No. 5,509,363, which is a continuation-in-part of Ser. No. 173,507, Dec. 22, 1993, Pat. No. 5,461,994, which is a continuation-in-part of Ser. No. 847,784, Mar. 5, 1992, Pat. No. 5,309,852.

[51] Int. Cl.$^6$ .................................................... A01B 35/16
[52] U.S. Cl. .......................... 111/157; 172/172; 172/536; 172/538; 172/731
[58] Field of Search ........................... 111/121, 195, 111/140, 157, 167; 172/536, 538, 172, 177, 765, 770, 771, 731, 721

[56] References Cited

U.S. PATENT DOCUMENTS

| | | | |
|---|---|---|---|
| 740,748 | 10/1903 | FitzMaurice | 172/172 X |
| 1,821,829 | 9/1931 | Coe et al. | 172/536 |
| 3,077,290 | 2/1963 | Rehder | 111/195 X |
| 3,085,635 | 4/1963 | Livrmore | 172/765 X |
| 3,177,830 | 4/1965 | Zimmerman . | |
| 3,180,291 | 4/1965 | Loomans | 111/195 X |
| 3,319,590 | 5/1967 | Zimmerman . | |
| 3,385,243 | 5/1968 | Zimmerman . | |
| 3,923,104 | 12/1975 | Tibbs | 172/765 X |
| 4,461,355 | 7/1984 | Peterson et al. | 111/140 X |
| 4,671,193 | 6/1987 | States | 111/195 X |
| 4,691,645 | 9/1987 | Anderson | 111/195 X |
| 4,844,174 | 7/1989 | Zimmerman | 172/538 |
| 5,309,852 | 5/1994 | Zimmerman | 111/121 |
| 5,461,994 | 10/1995 | Zimmerman | 111/121 |
| 5,461,995 | 10/1995 | Winterton | 111/157 X |
| 5,509,363 | 4/1996 | Zimmerman | 111/157 |

*Primary Examiner*—Terry Lee Melius
*Assistant Examiner*—Christopher J. Novosad
*Attorney, Agent, or Firm*—Wells, St. John, Roberts, Gregory & Matkin P.S.

[57] ABSTRACT

A seed drill includes a novel planting assembly combining press wheels for packing angular sides of a furrow and a runner immediately behind and longitudinally aligned with the press wheel. The runner includes an arcuate front edge that is juxtaposed immediately behind the coulter, thereby preventing accumulation of field trash between them. The runner extends rearwardly from beneath the press wheel and is transversely guided on the supporting vehicle frame of the drill to maintain it in longitudinal alignment within an open longitudinal slot cut through the soil and intersecting the base of the packed furrow. Seed is dropped into the open slot prior to being covered with soil. Moist soil can be packed along the sides of the furrow to maintain the furrow in an open condition during seed germination and plant emergence. Highly accurate planting depth control can be achieved, with provision for upward relative movement of the runner as required by encountered field conditions.

16 Claims, 5 Drawing Sheets

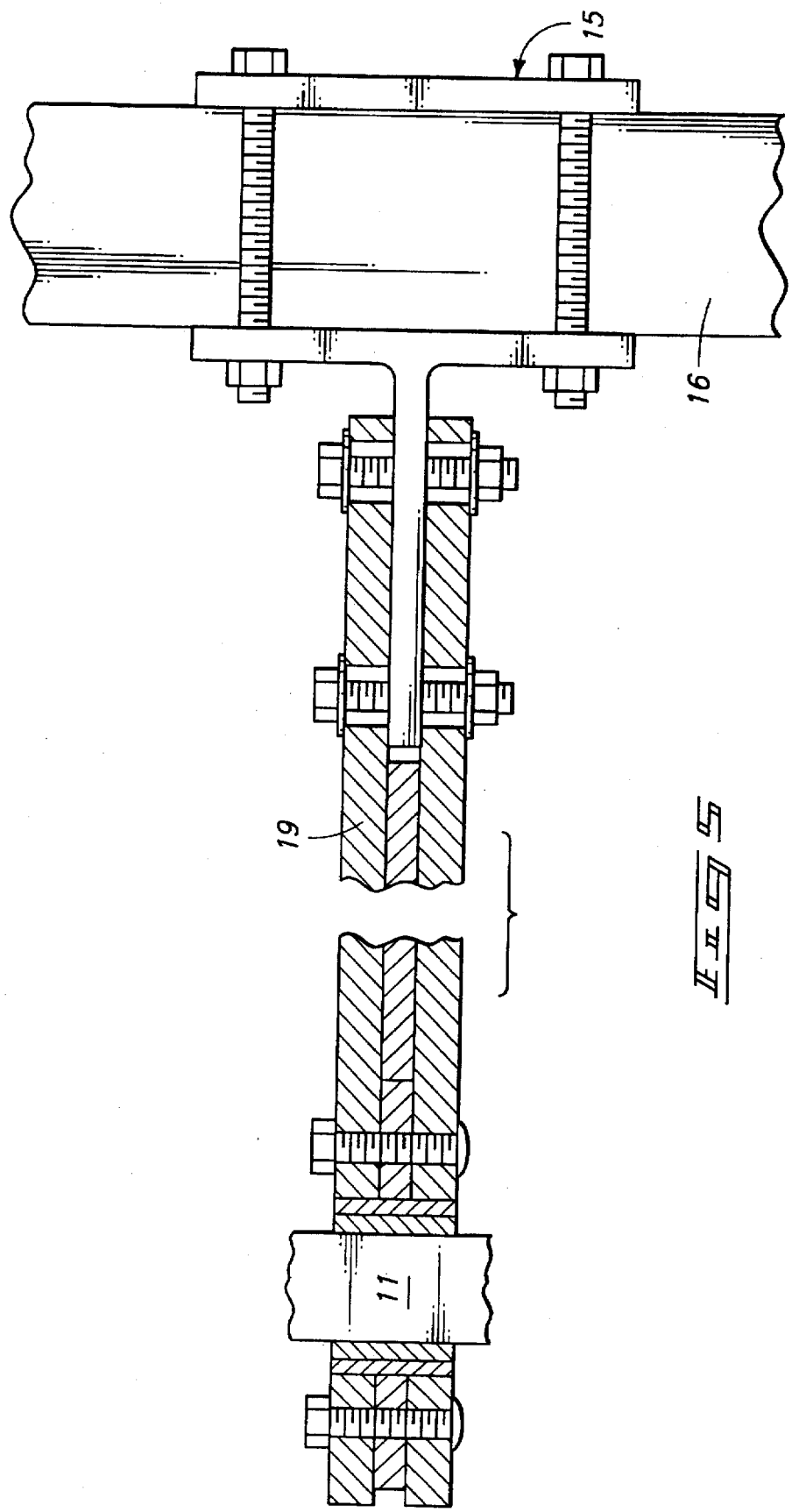

PLANTING ASSEMBLY FOR SEED DRILL

RELATED APPLICATIONS

This is a Continuation-in-Part of U.S. patent application Ser. No. 385,154, filed on Feb. 7, 1995, and titled "Seed Drill Guide Assembly", now U.S. Pat. No. 5,509,363, which is a Continuation-in-Part of U.S. patent application Ser. No. 173,507, filed on Dec. 22, 1993 and titled "Seed Drill Planting Assembly", now U.S. Pat. No. 5,461,994; which in turn is a Continuation-in-Part of U.S. patent application Ser. No. 847,748, filed on Mar. 5, 1992 and titled "Seed Drill", now U.S. Pat. No. 5,309,852.

TECHNICAL FIELD

This disclosure pertains to seed drills for planting crops such as grains. It specifically relates to improvements in placement of seeds in soil within an open longitudinal slot of a preset depth.

BACKGROUND OF THE INVENTION

This invention relates to improvements in a seed drill of the type generally disclosed in my U.S. Pat. No. 3,177,830, which was issued on Apr. 13, 1965. Modifications of this type of seed drill are disclosed in my U.S. Pat. Nos. 3,319,590, issued May 16, 1967, 3,177,830, issued Apr. 13, 1965, 3,385,243, issued May 28, 1968 and 4,844,174, issued Jul. 4, 1989. The disclosures of my four prior patents are hereby incorporated within this disclosure by reference.

The seed drills described in my referenced U.S. patents are designed for deep furrow seeding of crops. Seed is planted at the bottom of a furrow having packed sloping sides. This is accomplished by placing the seed into the slotted soil behind a shovel forward of and followed closely by press wheels that pack the sides of the open furrow. The press wheels pack the sloping sides of the furrow after seed placement in an attempt to assure accurate control of both planting depth and proper soil coverage over the seeds.

The above-referenced inventions were developed primarily for use in soil conditions where subsurface moist soil was covered by a substantial layer of dry loose soil. Such conditions are prevalent in the northwestern United States where winter wheat is grown by dry land farming techniques. While the referenced inventions have been widely adopted and have been proven to enhance seed germination and resulting crop yields when used, it is recognized that substantial variations in planting conditions continue to exist even where such improvements are used. This can be attributed to the natural variations that occur in the subsurface elevation of the moist soil and to surface undulations encountered where fields are not perfectly flat.

Under normal conditions, such planting equipment must be preset to place seed at an average depth that will normally locate it in moist soil. However, where the soil moisture line is below the average elevation for a field or where the equipment must span a slight dip in the soil contour, the planting equipment will place seeds in drier soil than is desirable. Such soil is very unstable and likely to slough downwardly to partially fill the furrow above the seed. When this occurs, expected growth from the germinating seed will be disrupted by the unwanted soil cover. This is particularly detrimental if there has been an intervening rain that forms a crust in the covering soil through which the emerging plant growth must penetrate.

Many of the problems of prior art drills, which usually required staggered placement of seed openers across the drills, were solved when an in-line version of the drill shown in U.S. Pat. No. 3,319,590 was commercially introduced. In these drills, a seed placement boot was overlapped within the following press wheels. The furrow opener was relatively narrow and could be effectively pulled through the field in a transverse straight line relationship of the shovel openers and press wheels.

This drill became very popular in summer-fallow areas. However, it was not without problems. It could not travel through much trash or straw when a furrow deeper than four inches was required to reach moist soil. In some of the drier areas, users were forced to revert back to staggered drills.

Later development of notched pressed wheels (U. S. Pat. No. 4,844,174) gave the in-line drills much better trash clearing capabilities, but the drills still encountered problems where five to six inches of dry soil was encountered. Under these drier conditions the pointed opener had to be able to retract rearwardly into the press wheels to clear field obstacles. It was physically impossible to design an opener of this design which could lift sufficient moist soil to form a covering over the sides of the furrows and hold the packed furrows open after seeding. In many situations three to four inches of dry soil would fall back over planted seed in the resulting deep furrows.

An ideal drill should produce a planting furrow, whether shallow or deep, with no dry dirt located over the seeds. It should be applicable to no-till seeding methods, as well as to conventional tilling techniques. Grain seeds should be positioned approximately one to two inches deep within packed moist soil with very consistent accuracy. Other types of seeds should be planted very accurately at depths ranging between one-fourth to one-half inch or even less.

Recognized shortcomings in the planting accuracy of the drills described in my prior patents have led me to the discovery of a new relationship between the planting runner for placement of seeds and the press wheels that pack the furrow sides as disclosed herein. With this new drill, because of the relative locations of the component parts in a planting sequence, each operation carried out by these component parts contributes to formation of a perfect furrow and accurate seed placement. Seed is planted in a carefully defined slot after furrow formation and packing has been completed. No uncontrolled seed coverage can occur in the packed furrow. When planting in moist soil conditions, no furrow formation is required. Use of this accurate seed placement equipment will result in substantially higher yields and eliminate or minimize the necessity of reseeding, regardless of weather encountered after the seeding sequence has been carried out.

BRIEF DESCRIPTION OF THE DRAWINGS

A preferred embodiment of the invention is described below with reference to the accompanying drawings, which are briefly described below.

FIG. 5 is an enlarged fragmentary sectional view taken through the press wheel axis and along a tool bar support.

DETAILED DESCRIPTION OF THE PREFERRED EMBODIMENTS

Figure 1:
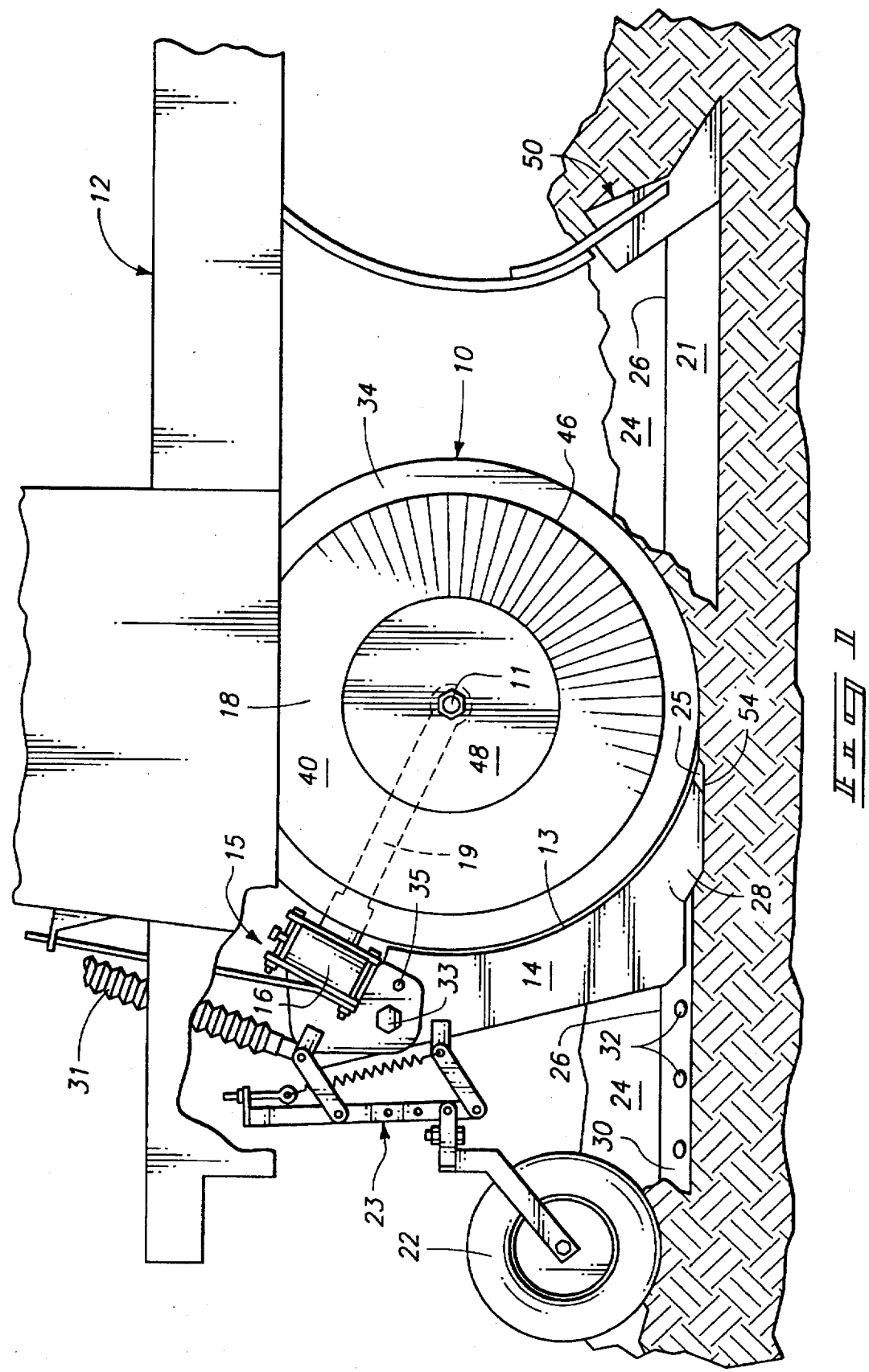
FIG. 1 is a fragmentary side elevation view of the planting assembly for a seed drill, illustrating the process of planting seeds under normal field conditions.
Figure 2:
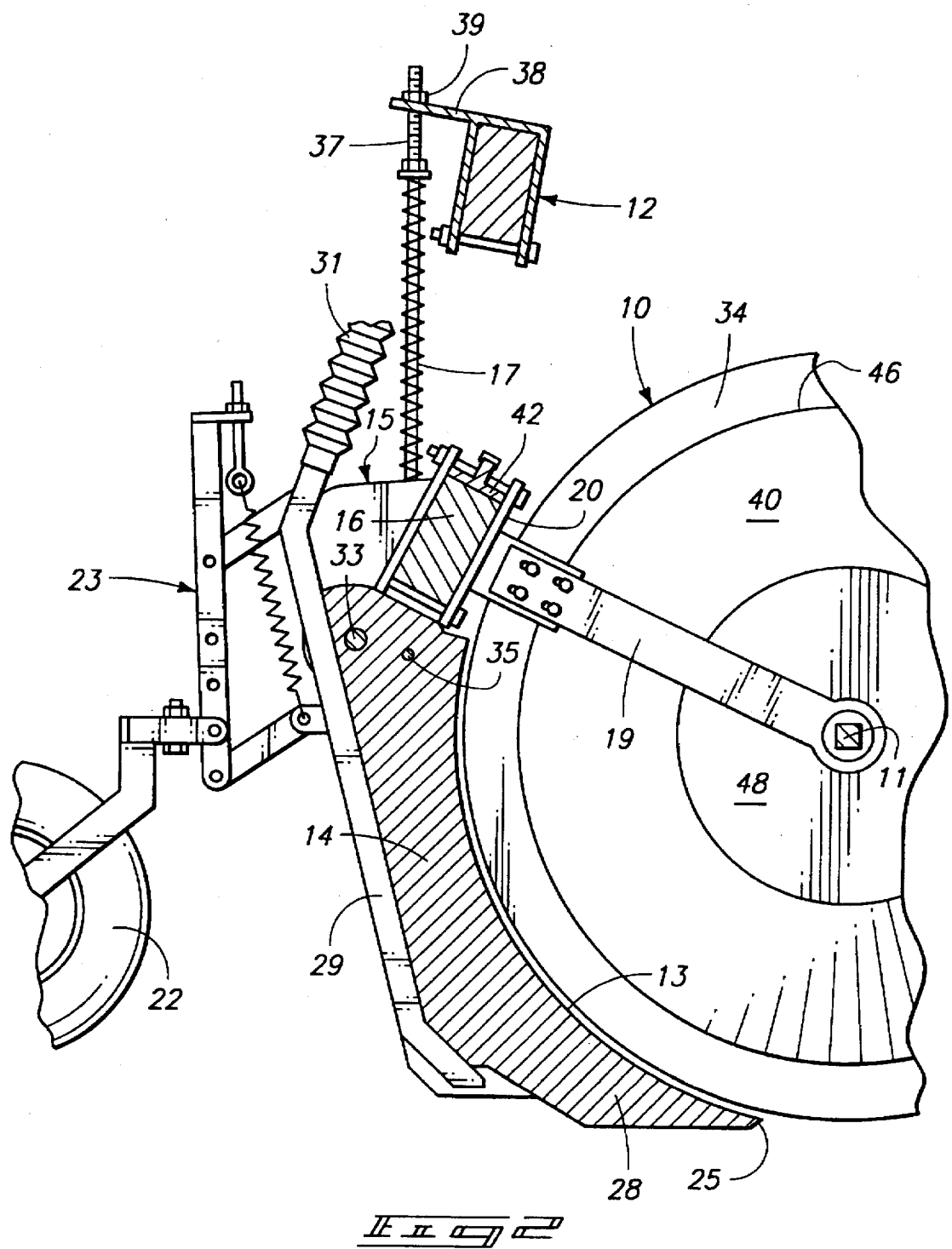
FIG. 2 is an enlarged fragmentary sectional view of the planting assembly taken through the longitudinal center of a boot.

This disclosure of the invention is submitted in furtherance of the constitutional purposes of the U.S. Patent Laws "to promote the progress of science and useful arts"(Article 1, Section 8).

This invention is a simplified version of the planting units described in the three parent applications that preceded the filing of the present application. It eliminates contact between the boot supporting a runner forming a seed-receiving slot and the press wheel assembly associated with the boot. In this form of the invention, the boot and runner are supported about the axle of the press wheel. The runner is juxtaposed immediately behind a projecting circular coulter that is normally part of the associated press wheel assembly.

This form of the seed drill planting assembly has been developed primarily for planting grains in dry field conditions where a moist subsurface is covered by a surface layer of dry loose soil. However, its practical field applications are not limited to such conditions. It can also be used for planting seed at more shallow depths in moist surface soil conditions where formation of deep furrows is not required. It is also applicable to no-till applications and without furrow formation, where seed is planted in a field containing stubble from a prior crop without cultivation of the field prior to seeding; as well as in minimum-till situations where prior field cultivation is limited and relatively shallow in depth.

As with previous embodiments of this invention, the present planting assembly for a seed drill has been developed about paired press wheels 18 rotatably mounted about a transverse axis on a supporting frame 12. The paired press wheels 18 have tapered or conical surfaces 40 leading to a rim 46. Surfaces 40 are capable of packing the sloping sides of a longitudinal furrow as they roll through it. The illustrated sloping sides 24 of the packed furrow lead downwardly to a furrow base 26.

While conical press wheels are illustrated, it is to be understood that the supporting press wheel assemblies 10 associated with the seed drill planting assembly might be substantially cylindrical where formation of a furrow is unnecessary for planting purposes. This is particularly true in no-till planting operations, and where seeds are to be planted at very shallow depths within a field.

A circular coulter 34 is preferably positioned between the paired press wheels 18. The use of coulters 34 in press wheel assemblies 10 is not always practical, particularly where very rocky soil is likely to be encountered. A single press wheel element can be utilized in place of the paired press wheels 18 shown in the drawings when the coulter 34 is not present.

The primary purpose of the illustrated coulter 34 is to either cut or reestablish a seed-receiving slot along the base of the packed furrow. A secondary benefit is its inherent resistance to side slippage of the seed drill when operated along hillsides.

The illustrated press wheels 18 comprise a pair of oppositely facing press wheel elements. The two opposed elements can be separately formed or fabricated as an integral unit. Each has a circular rim 46 centered about a press wheel transverse axis. Each also includes a coaxial circular wall 48 that is perpendicular to the transverse axis and is offset from rim 46 in a direction parallel to the transverse axis. The diameter of the circular wall 48 is less than the diameter of rim 46. Circular wall 48 can be planar or can be inwardly dished.

Coaxial conical surfaces 40 complete the basic structure of each press wheel element. They join the rim 46 and circular wall 48. The conical surfaces 40 are inclined outwardly from the rim 46.

The press wheel elements, when formed separately, will also normally include an inner circular wall that is also perpendicular to its transverse axis and is transversely spaced from wall 48 to complete a hollow enclosed wheel structure. However, such an inner wall is not vital to the operative exterior surfaces of the press wheels 18 and can be omitted or modified in the case of integrally formed press wheels.

The press wheels shown in the drawings are designed for deep furrow seeding, along furrows that typically have depths greater than two inches below the field surface. Examples of deep furrows include furrows having depths of three to six inches, or even more. When used for no-till field applications and for planting seeds in shallow furrows, the widths of the conical walls 50 across the press wheels 18 can be substantially decreased, thereby permitting the row spacings to be decreased as well.

The periphery of each illustrated press wheel 18 has a continuous and uninterrupted circular configuration. However, it is to be understood that the press wheel periphery configuration can be interrupted by open recesses of the type taught in my U.S. Pat. No. 4,844,174 where the benefits of such recesses are desired by a user.

The circumferential coulter 34 that projects radially outward from between the rolling press wheel elements cuts a vertical slot 30 between the packed sloped sides 24 of a furrow. Coulter 34 is perpendicular to and coaxially centered about the transverse axis of the press wheels 18. The rims 46 of the press wheel elements lead inwardly to the coulter 34, which is abutted by them. The outside diameter of coulter 34 is greater than the outside diameter of the abutting rims 46.

Coulter 34 can be formed as a separable circular disk or as an annular element joined between opposed press wheel elements. It also might be fabricated integrally with the associated press wheels 18 as a unitary rolling member. Coulter 34 rotates in unison with a pair of separately fabricated press wheels 18 about a common central axis. The outer periphery of coulter 34 is preferably sharpened to assist in penetrating moist soil through which it rolls during formation of the planting slot 30.

While the rolling action of press wheels 18 and coulter 34 alone might be used in a "no-till" seeding procedure where seeding is accomplished under relatively shallow conditions, in most instances the described planting assembly will be used in conjunction with a longitudinally aligned opener, such as the illustrated shovel 50 or a conventional coulter assembly (not shown).

The seed drill as shown in the accompanying drawings is specifically designed to utilize a multi-stage development of packed furrows. The sloping sides 24 of the furrows are typically first cut by passage of an opener, such as a double disk coulter or shovel 50. The lowermost portion of the furrow produced by the opener should include a longitudinal slot 21 below the intended base 26 of the packed furrow.

Shovel 50 can also be utilized for placement of fertilizer within the formed furrows. By running a fertilizer delivery tube along the back edge of a vertical blade 62 at the bottom of shovel 50, one can deposit solid, gaseous or liquid fertilizer in the base of the slot formed by it.

The detailed structures of specific forms of the press wheels 10, coulter 34 and shovel 50 are best understood by reference to the disclosure of U.S. Pat. No. 5,461,994, which is hereby incorporated into this disclosure by reference.

The sloping sides 24 of the furrow are next packed by the rolling pressure of opposed press wheel surfaces 40 that refine the furrow side slopes. After the furrow sides 24 have been packed, the slot 21 at its base is temporarily filled. Immediate passage of a narrow vertical runner 28 guided transversely between the press wheels reshapes an open seed-receiving slot 30 extending beneath and behind the press wheels 18.

Seeds 32 are dropped into the open slot 30 in longitudinal alignment with the runner 28 that shapes it. The seed-receiving slot 30 extends vertically between the furrow base 26 intersected by it and a bottom slot surface 27 on which the delivered seeds 32 are supported. The open slot 30 is subsequently closed by passage of a packing wheel 22. Moist soil is firmed around the seed as the slot is closed, insuring effective seed germination.

Figure 3:
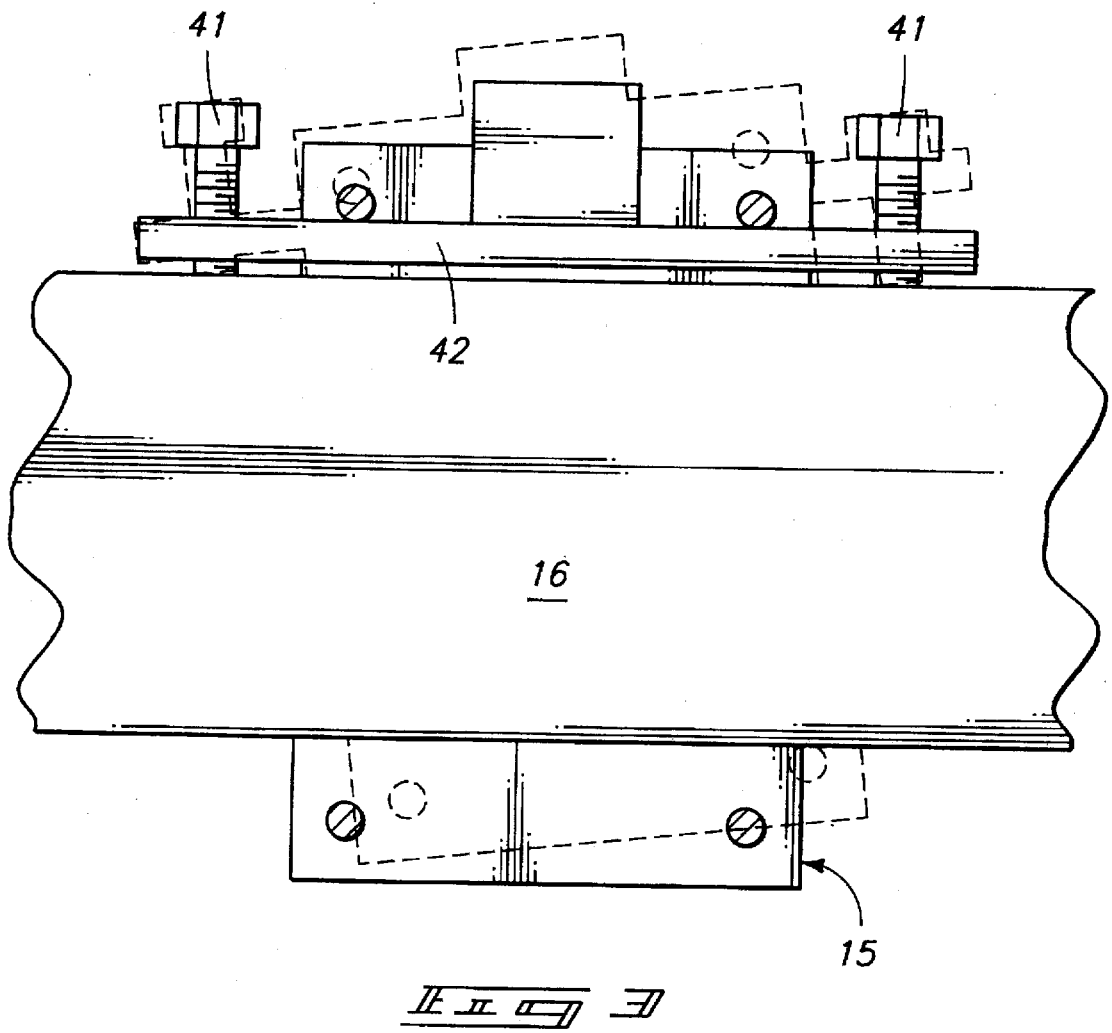
FIG. 3 is an enlarged fragmentary sectional view showing provision of angular adjustment between the tool bar and a clamp bracket.
Figure 4:
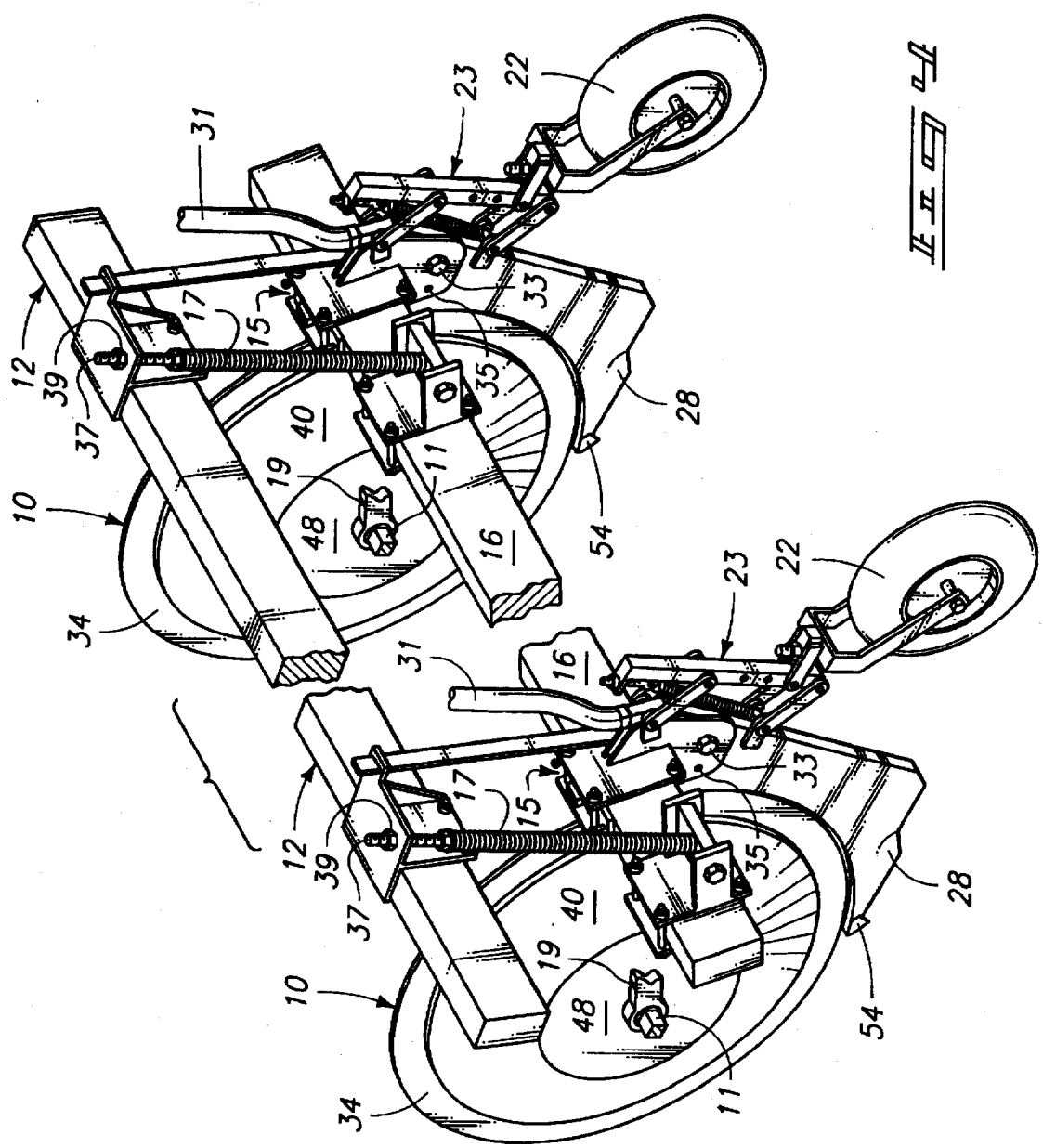
FIG. 4 is a rear perspective of the planting assembly.

The present form of the seed drill planting assembly basically includes a press wheel assembly 10 rotatably mounted about a horizontal transverse axis on a vehicle frame 12 for rolling soil engagement while moving in a forward direction along a field. A rigid narrow boot 14, having an upright arcuate front edge 13, is transversely centered and juxtaposed immediately behind the press wheel assembly 10. The arcuate configuration of front edge 13 is coaxially centered about the axis of the press wheel assembly 10. A longitudinal runner 28 is formed at a lower end of the boot 14 and extends rearwardly from beneath the associated press wheel assembly 10. A boot frame 15 pivotally mounts the boot 14 about the axis of the press wheel assembly 10. A seed delivery tube 31 on the boot 14 is provided for depositing seeds immediately behind the runner 28 (see FIG. 3).

The rigid boot 14 has a longitudinal dimension, in the direction of movement of the seed drill, that is substantially greater than the boot thickness. It is pivotally supported on the movable vehicle frame 12 for permitting movement of the boot 14 and runner 28 along an upright arcuate path centered about the transverse axis of the press wheel assembly 10. Unlike prior embodiments of the invention, the boot is not directly guided on any member within the associated press wheel assembly 10.

Runner 28 is shown as being integral with boot 14, but can be separably fabricated and releasably joined to it if desired. The forward end of runner 28 is positioned immediately adjacent to the periphery of the coulter 34 and is pointed to complement the shape of coulter 34 and minimize any gap between them.

The boot frame 15 includes a transverse rigid tool bar 16 positioned behind and spanning a plurality of press wheel assemblies 10 rotatably mounted about a common axis on the supporting vehicle frame. A pair of rigid supports 19 pivotally mount the tool bar 16 about the common axis of the press wheel assemblies 10. Each support 19 has one end fixed to the boot frame 15 at spaced locations along the length of tool bar 16, and a remaining end pivotally journalled about the axle centered along the common axis of the press wheel assemblies 10 on the vehicle frame 12.

The tool bar 16 might span any desired number of press wheel assemblies 10 and associated boots 14. As one example applicable to current seed drill technology, each tool bar 16 might carry four boots 14 and be located behind four press wheel assemblies 10 on the supporting vehicle frame 12. Multiples of such tool bars 16 can be located across one or more vehicle frames 12 to enable seeding of any desired field width in a single pass.

Boot frame 15 also includes a plurality of clamp brackets 20, which are bolted along the length of tool bar 16. Each clamp bracket 20 rigidly connects one of the boots 14 to the tool bar 16.

Each clamp bracket 20 includes a vertical pair of plates that overlap the upper end of one of the boots 14. A pivotal connection between clamp bracket 20 and boot 14 is provided by an intersecting transverse pivot bolt 33 centered about an axis parallel to the axis of the press wheel assemblies 10. A shear pin 35 transversely interconnects each boot 14 and its associated clamp bracket 20 at a location spaced from the location of pivot bolt 33, normally holding the boot 14 rigid with respect to the supporting clamp bracket 20. Shear pin 35 serves as a breakable restraining member interconnecting the boot 14 and the clamp bracket 20 for normally preventing pivotal motion between them during use of the seed drill.

At least one spring 17 is yieldably interposed between the tool bar 16 and the supporting vehicle frame 12 for urging the boots 14 and runners 28 associated with the tool bar 16 downwardly relative to the press wheel assemblies 10. This is illustrated in the drawings as a compression spring whose loading is varied by a central elongated bolt 37. Two such springs are provided at opposite ends of each tool bar 16.

At least one adjustable stop also interconnects the tool bar 16 and the vehicle frame 12 for limiting downward movement of the boots 14 and runners 28 relative to the press wheel assemblies 10. Two such stops are illustrated. Each comprises a bracket 38 on the vehicle frame 12 and an adjustable nut 39 threadably engaged about the upper end of one of the elongated bolts 37.

Each upright boot 14 is mounted immediately behind one of the press wheel assemblies 10, shown as paired press wheels 18 and a central coulter 34. Boot 14 must be rigid so as to not noticeably deflect or bend during its intended use. It can be effectively fabricated from three layers of steel or other suitable rigid material. The total thickness of boot 14 is substantially less than its front-to-back width in the direction of tool movement. In one specific implementation, its thickness is about twice the thickness of coulter 34. This thickness decreases at the bottom end of boot 14, which tapers to a thickness along runner 28 that is substantially equal to the thickness of coulter 34.

The front edge 13 of each boot 14 is shaped along an arc that is complementary to the adjacent periphery of a coulter 34. Edge 13 should be formed straight across the boot 14 without transverse curvature. In this manner, the development of side forces by engaged field trash riding upwardly between boot 14 and coulter 34 is eliminated or minimized.

The front edge 13 is juxtaposed immediately behind the coulter 34 with which it is aligned. The spacing between them can be as close as 0.001 inches. The resulting shearing action between the sharpened periphery of the rotating coulter 34 and the nonrotating transverse edge 13 of boot 14 effectively cuts through any field stubble or trash that might ride upwardly over the point 25 of runner 28. This has been found to be of great value when applying the planting apparatus to "no till" seeding applications.

Seed is delivered from a conventional storage box and a seed metering assembly (not shown) of conventional design that supply a controlled volume of seeds to a flexible seed delivery tube 31. The lower end of the seed delivery tube 31 directs the seeds into a duct 29 formed along the upright rear edge of boot 14 (see FIG. 3). The bottom end of duct 29 leads to an opening rearwardly adjacent to the back edge of runner 28. Thus, individual seeds can drop freely through boot 14 and are deposited behind the moving runner 28.

The front end of runner 28 includes small flared wings 55 that scrape and disrupt the side walls of the slot that has been formed at the base of the furrow by rolling action of coulter 34. The scraping action of wings 54 in the moist soil at the sides of the slot fills that portion of the slot 30 not maintained in an open condition by the presence of runner 28.

In most instances, the runner elevation will be such that its lowermost edge is at an elevation above the lowermost elevation of coulter 34. The purpose of runner 28 is normally not to open the slot at the base of the furrow, which is accomplished by the action of coulter 34. Its purpose is to refine the configuration of the slot 30 and to maintain it in an open and carefully defined shape for accurate seed placement at a preselected depth behind the runner 28.

The planted seeds are covered within slot 30 by subsequent rolling passage of a packing wheel 22 that trails behind the supporting boot 14. The packing wheel 22 is typically spring-biased to apply covering pressure to soil above the planted seeds. The structure and operation of such packing wheels is well known in seed drill technology. More specifically, the packing wheel 22 is carried on a spring biased parallelogram linkage 23 pivotally anchored at the upper end of boot 14 and at the clamp bracket 20. Further details concerning the yieldable support for each packing wheel 22 are not believed necessary for an understanding of the present improvements.

Furrow formation and seed deposition can best be understood from a study of FIG. 1. The initial furrow is produced by passage of shovel 50 or some other form of conventional opener, such as a double disk coulter. Shovel 50 forms a rough open furrow whose sides are covered by loose moist soil. An extended slot 21, produced by action of shovel blade 62, extends vertically from the furrow base and a slot bottom surface 11. If the rough furrow is formed by a double disk coulter or other opener, the cut soil might extend in a continuous slot from the field surface to the elevation indicated in FIG. 1 by the reference numeral 11.

The subsequent rolling action of press wheels 18 will pack the furrow sides 24 in a predefined sloping configuration. The sides 24 will be firmed in a shape-retaining manner because of the covering of moist soil provided by action of the disclosed shovel 50. The rolling pressure of press wheels 18 will also close the slot 21. The slot is then partially reestablished by the cutting action of rolling coulter 34.

The side walls of the newly reestablished slot are immediately disrupted by wings 55 at the point 25 on runner 28. This fills the slot, except where it is held open by the downwardly projecting structure of runner 28. Sliding passage of runner 28 subsequently smooths the sides and bottom surface 27 of the seed-receiving slot 30 that is open immediately behind runner 28.

The shovel 50, press wheels 18, coulter 34, boot 14 and runner 28 act cooperatively to assure highly accurate depth placement of seeds 32 at the base of the packed furrow.

The working depth relationship between these elements is shown in FIG. 1. It can be adjusted directly by raising or lowering the tool bar 16 by adjusting the previously-described stops presented by brackets 38 and nuts 39. Boot 14 should maintain the bottom edge of runner 28 at an elevation such that its lowermost elevation is somewhat above the lowermost elevation of the circular coulter 34. Similarly, the downward extension of vertical blade 62 from the lower edge 60 of plate 58 in shovel 50 is greater than the radial dimension of coulter 34 that protrudes from the press wheel rims 46.

With the lower edge 60 across shovel 50 preset to an elevation substantially identical to the elevation of press wheel rims 46, the bottom of the slot produced by passage of shovel blade 62 will be at an elevation beneath the slot formed by rolling action of coulter 34. Thus, placement of fertilizer behind the shovel blade 62 can take place at an elevation below that at which seed is deposited behind runner 28. Fertilizer placed behind shovel 50 will be covered by loose soil falling within the newly-opened furrow, as well as by the subsequent rolling action of press wheels 18 and coulter 34, which support the weight of the seed drill. This will pack soil above the fertilizer and prevent subsequent intermixing of fertilizer and seed.

When adjusting the seed drill for normal usage during planting procedures, the elevational position of each shovel 50 on frame 12 is selected so as to maintain its horizontal lower edge 60 below the soil moisture line at all times. This is accomplished by adjustment of a conventional linkage support system (not shown) on the conventional seed drill frame 12. With the shovels 18 at this depth, the rims 46 of press wheel 18 will roll along the open furrow at the same elevation as the lower edge 60 of the aligned shovel 50. Since the rims 46 define the base 26 of the packed furrow, one can then adjust the elevation of boot 14 relative to press wheels 18. The elevation of the lowermost edge along runner 28 can be adjusted to any elevation slightly above the lowermost elevation of the coulter 34.

With the elements adjusted as just described, the base 26 of the furrow will remain in moist soil. The sides of the furrow will have moist soil deflected over them by operation of deflector 65 and front surface 61 of shovel 50. An open slot will be formed behind the shovel blade 62 to an elevation below the lowermost elevation of the periphery of coulter 34. The slot will be partially filled behind the shovel 50 and the portions of it under coulter 34 will be filled by rolling passage of press wheels 18 and coulter 34. Rolling movement of coulter 34 will reopen and redefine the soil slot at the base of the furrow and produce an open slot structure within which the runner 28 can slide as the seed drill travels longitudinally through the field.

The close proximity of runner 28 to the perimeter of coulter 34 substantially prevents any soil from falling into that portion of the slot filled by the runner 28 until passage of the runner has been completed. Seed is dropped immediately behind runner 28 and is accurately deposited at the selected depth within the open slot 30 prior to being covered by passage of packing wheel 22, which rolls along the base 26 of the furrow.

Because soil conditions vary about a field, the actual elevation of runners 28 along a tool bar 16 can change slightly as more or less soil resistance is encountered by the runner 28. Boots 14 will pivot upwardly about the arc centered on the transverse press wheel axis in opposition to springs 17 to maintain even pressure against the subsoil structure. This amount of movement will normally be relatively slight.

When a subsoil obstacle, such as a rock, is encountered, the individual boots 14 and runners 28 can pivot both upwardly and rearwardly to clear it. The rearward force against a large rock would otherwise cause structural damage to the seeding assembly components. For this purpose, boot 14 not only moves upwardly with the tool bar, but is interconnected to the supporting frame by the previously-described breakaway feature. After any shear pin 35 has broken, the affected boot will slide over the obstacle and will not be in an operative condition until a new shear pin has been installed.

It is important to note the accurate longitudinal alignment of the various components. The shovel blade 62, the vertical coulter 34 and the runner 28 are at all times in longitudinal alignment with one another. The critical alignment of runner 28 and coulter 34 is assured by the fact that boot 14 is rigid and cannot be displaced by turning forces or other resistance encountered in the soil being worked. Fine vertical adjustment of each boot 14 is achieved by turning upright bolts 41 that are threadably engaged through a plate 42 within each clamp bracket 20. bolts 41 bear against the upper surface of tool bar 16 to incline the orientation of boot 14 as required to precisely align its front edge 13 with the coulter 34.

The supporting frame 12 can also optionally supports scrapers (not shown) that movably engage the side surfaces of coulter 34 to remove mud and debris that might otherwise impede rolling formation of a clean slot by soil penetration of the coulter 34. General details of such scrapers are shown in U.S. Pat. No. 5,461,994, which has been incorporated into this disclosure by reference.

The drawings depict the elements of the invention in the preferred forms recognized at the time this embodiment was designed. Alternative forms of these elements can be substituted as substantial replacements dictated by particular machine requirements.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. A seed drill planting assembly comprising:

a press wheel assembly rotatably mounted about a horizontal transverse axis for rolling soil engagement while moving in a forward direction along a field;

a rigid narrow boot having an upright arcuate front edge transversely centered and juxtaposed immediately behind the press wheel assembly, the arcuate configuration of its front edge being coaxially centered on the axis of the press wheel assembly;

a longitudinal runner formed at a lower end of the boot and extending rearwardly from beneath the press wheel assembly;

a boot frame pivotally mounting the boot about the axis of the press wheel assembly; and a seed delivery tube on the boot for depositing seeds immediately behind the runner.

2. The seed drill planting assembly of claim 1, wherein the boot is pivotally connected to the boot frame about an axis that is parallel to the axis of the press wheel assembly; and a shear pin transversely interconnecting the boot and boot frame at a location spaced from the location of the pivotal connection between them.

3. The seed drill planting assembly of claim 1, wherein the boot frame includes a transverse rigid tool bar positioned behind the press wheel assembly and a clamp bracket releasably fixed to the tool bar, the clamp bracket being pivotally connected to the upper end of the boot about an axis that is parallel to the axis of the press wheel assembly; and a shear pin transversely interconnecting the boot and clamp bracket at a location spaced from the location of the pivotal connection between them.

4. The seed drill planting assembly of claim 1 wherein the boot is longitudinally aligned with the forward direction of the press wheel assembly.

5. The seed drill planting assembly of claim 1, further comprising:

a supporting vehicle frame carrying the press wheel assembly;

at least one spring yieldably interposed between the boot frame and the vehicle frame for urging the boot and runner downwardly relative to the press wheel assembly.

6. The seed drill planting assembly of claim 1, further comprising:

a supporting vehicle frame carrying the press wheel assembly;

at least one spring yieldably interposed between the boot frame and the vehicle frame for urging the boot and runner downwardly relative to the press wheel assembly; and an adjustable stop interconnecting the boot frame and the vehicle frame for limiting downward movement of the runner relative to the press wheel assembly.

7. A seed drill planting assembly comprising:

a press wheel assembly rotatably mounted about a horizontal transverse axis for rolling soil engagement while moving in a forward direction along a field, the press wheel assembly including a coulter having a circular periphery centered about the wheel axis;

a rigid narrow boot having an upright arcuate front edge transversely centered and juxtaposed immediately behind the coulter of the press wheel assembly, the arcuate configuration of its front edge being coaxially centered on the axis of the press wheel assembly;

the boot including a longitudinal runner formed at a lower end of the boot, the runner extending rearwardly from beneath the press wheel assembly in longitudinal alignment with the coulter;

a boot frame pivotally mounting the boot about the axis of the press wheel assembly; and a seed delivery tube on the boot for depositing seeds immediately behind the runner.

8. The seed drill planting assembly of claim 7, further comprising:

a shaft pivotally connecting the boot and the boot frame for motion about a transverse horizontal axis; and a breakable restraining member interconnecting the boot and the boot frame for normally preventing pivotal motion between them during use of the seed drill.

9. The seed drill planting assembly of claim 7, further comprising:

a shaft pivotally connecting the boot and the boot frame for motion about a transverse horizontal axis; and a breakable restraining member interconnecting the boot and the boot frame for normally preventing pivotal motion between them during use of the seed drill, the breakable restraining member being a shear pin transversely interconnecting the boot and boot frame at a location spaced from the location of the pivotal connection between them.

10. The seed drill planting assembly of claim 7 wherein the boot frame comprises:

a transverse rigid tool bar positioned behind and spanning a plurality of press wheel assemblies rotatably mounted about a common axis.

11. The seed drill planting assembly of claim 7 wherein the boot frame comprises:

a transverse rigid tool bar positioned behind and spanning a plurality of press wheel assemblies rotatably mounted about a common axis; and a pair of rigid supports each having one end fixed to the boot frame at spaced locations along the length of the tool bar, the remaining end of each rigid support being pivotally journalled about the common axis of the press wheel assemblies.

12. The seed drill planting assembly of claim 7 wherein the boot frame comprises:

a transverse rigid tool bar positioned behind and spanning a plurality of press wheel assemblies rotatably mounted about a common axis; and a plurality of clamp brackets located along the tool bar, each clamp bracket being pivotally connected to the upper end of one of the boots about an axis that is parallel to the axis of the press wheel assembly.

13. The seed drill planting assembly of claim 7 wherein the boot frame comprises:

a transverse rigid tool bar positioned behind and spanning a plurality of press wheel assemblies rotatably mounted about a common axis;

a plurality of clamp brackets located along the tool bar, each clamp bracket being pivotally connected to the upper end of one of the boots about an axis that is parallel to the axis of the press wheel assembly;

a shear pin transversely interconnecting each boot and its associated boot frame at a location spaced from the location of the pivotal connection between them.

14. The seed drill planting assembly of claim 7 wherein the boot frame comprises:

a transverse rigid tool bar positioned behind and spanning a plurality of press wheel assemblies rotatably mounted about a common axis; and a plurality of clamp brackets, each clamp bracket rigidly connecting one of the boots to the tool bar.

15. The seed drill planting assembly of claim 7 wherein the boot frame comprises:

a transverse rigid tool bar positioned behind and spanning a plurality of press wheel assemblies rotatably mounted about a common axis; and a plurality of clamp brackets, each clamp bracket rigidly connecting one of the boots to the tool bar;

the seed drill planting assembly further comprising:

a supporting vehicle frame carrying the press wheel assemblies; and at least one spring yieldably interposed between the tool bar and the vehicle frame for urging the boots and runners associated with the tool bar downwardly relative to the press wheel assemblies.

16. The seed drill planting assembly of claim 7 wherein the boot frame comprises:

a transverse rigid tool bar positioned behind and spanning a plurality of press wheel assemblies rotatably mounted about a common axis; and a plurality of clamp brackets, each clamp bracket rigidly connecting one of the boots to the tool bar;

the seed drill planting assembly further comprising:

a supporting vehicle frame carrying the press wheel assemblies; and at least one adjustable stop interconnecting the tool bar and the vehicle frame for limiting downward movement of the boots and runners associated with the tool bar relative to the press wheel assemblies.

* * * * *